(12) United States Patent
Mourton

(10) Patent No.: US 8,556,634 B2
(45) Date of Patent: Oct. 15, 2013

(54) SELF-CONTAINED NEEDLE INSERTION TRAINING SYSTEM

(75) Inventor: Robb Mourton, Grover, MO (US)

(73) Assignee: Tactical Care Concepts, LLC, Grover, MO (US)

( * ) Notice: Subject to any disclaimer, the term of this patent is extended or adjusted under 35 U.S.C. 154(b) by 699 days.

(21) Appl. No.: 12/694,107

(22) Filed: Jan. 26, 2010

(65) Prior Publication Data
US 2010/0196868 A1  Aug. 5, 2010

Related U.S. Application Data

(60) Provisional application No. 61/147,372, filed on Jan. 26, 2009.

(51) Int. Cl.
*G09B 23/28* (2006.01)

(52) U.S. Cl.
USPC .......................................... 434/272

(58) Field of Classification Search
None
See application file for complete search history.

(56) References Cited

U.S. PATENT DOCUMENTS

| | | | |
|---|---|---|---|
| 4,198,766 A | | 4/1980 | Camin |
| 6,083,008 A | * | 7/2000 | Yamada et al. ............... 434/267 |
| 7,316,568 B2 | * | 1/2008 | Gordon et al. ................ 434/262 |
| 7,850,456 B2 | * | 12/2010 | Chosack et al. ............... 434/272 |
| 7,857,626 B2 | * | 12/2010 | Toly .............................. 434/267 |
| 8,108,190 B2 | * | 1/2012 | Riener et al. .................... 703/11 |

FOREIGN PATENT DOCUMENTS

| WO | 2007146840 A2 | 12/2007 |
|---|---|---|
| WO | 2007146840 A3 | 12/2007 |

OTHER PUBLICATIONS

Internet search "Life/form(R) Venatech IV Trainer—White" May 2008.

* cited by examiner

*Primary Examiner* — Kurt Fernstrom
*Assistant Examiner* — Dolores Collins
(74) *Attorney, Agent, or Firm* — Polster, Lieder, Woodruff & Lucchesi, L.C.

(57) ABSTRACT

A self-contained medical needle insertion training system is provided. In various embodiments, the system includes a hollow body having at least one sidewall, a closed end, an opposing open end and an interior chamber. The system additionally includes a closure device structured and operable to mate with the open end to close the interior chamber and a simulated cardiovascular vein disposed along an outer surface of the at least one sidewall, wherein the interior chamber provides a storage space for medical devices to be used in association with the training system. The system also includes a simulated cardiovascular vein having a plurality of fluid reservoirs.

27 Claims, 4 Drawing Sheets

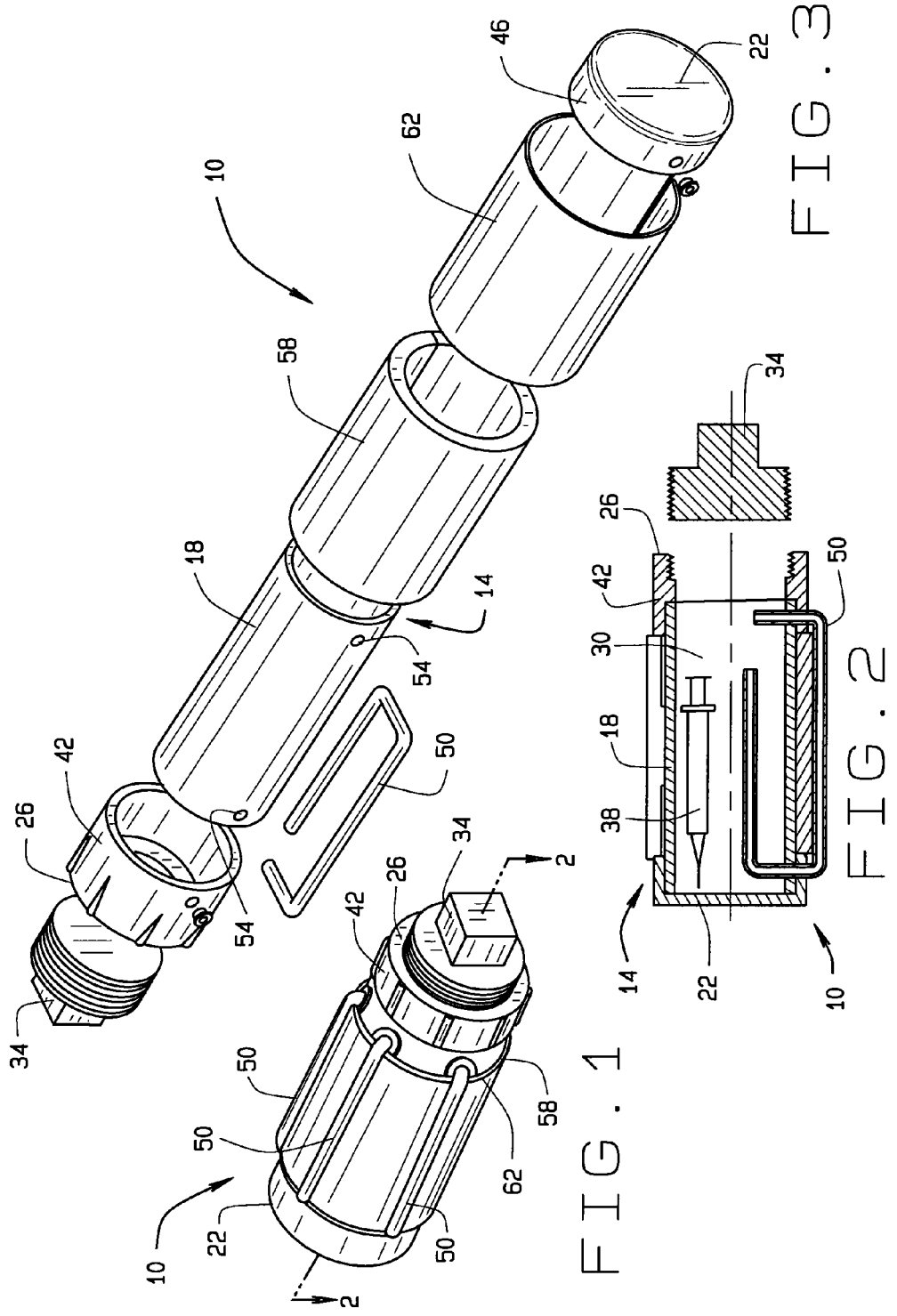

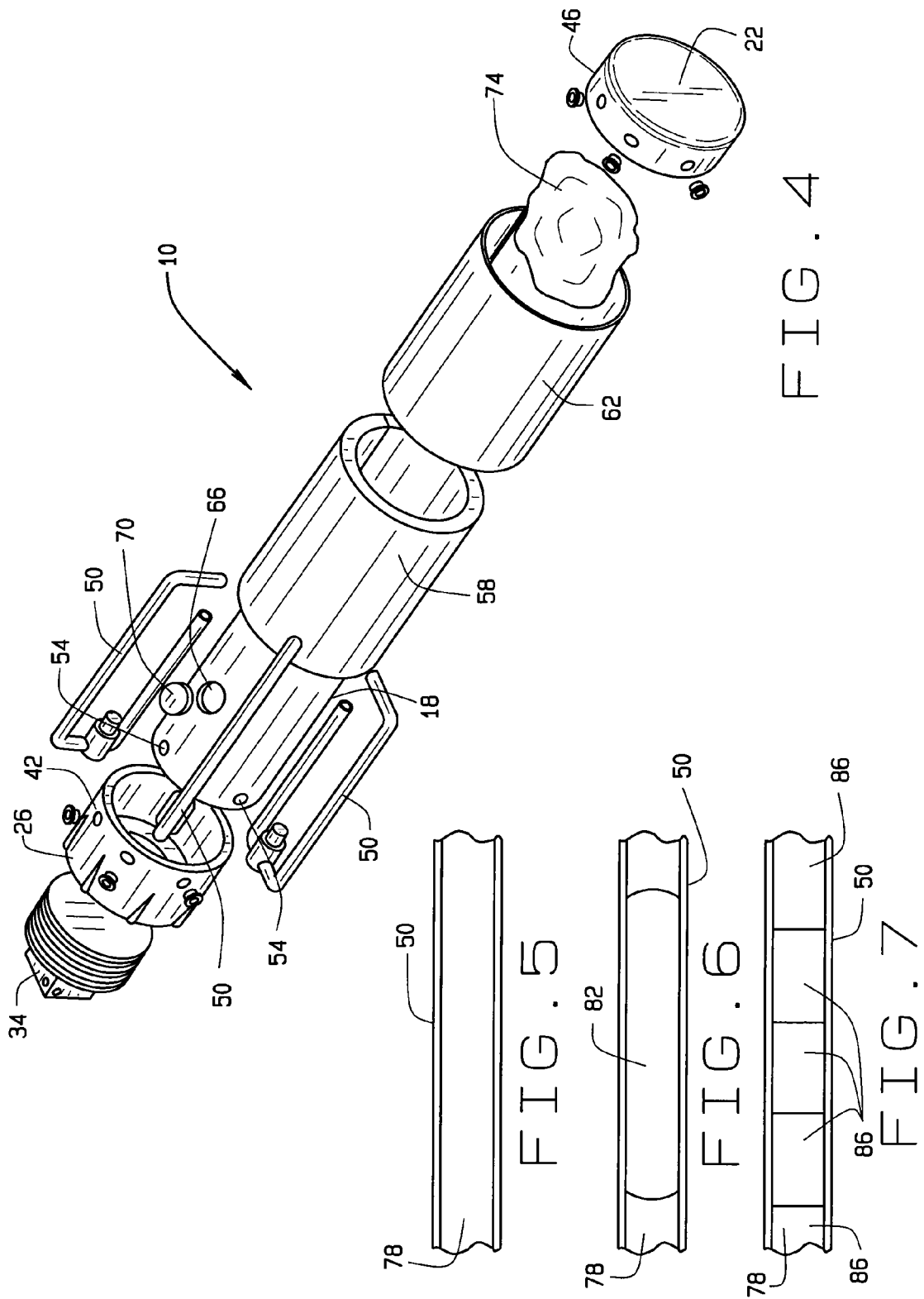

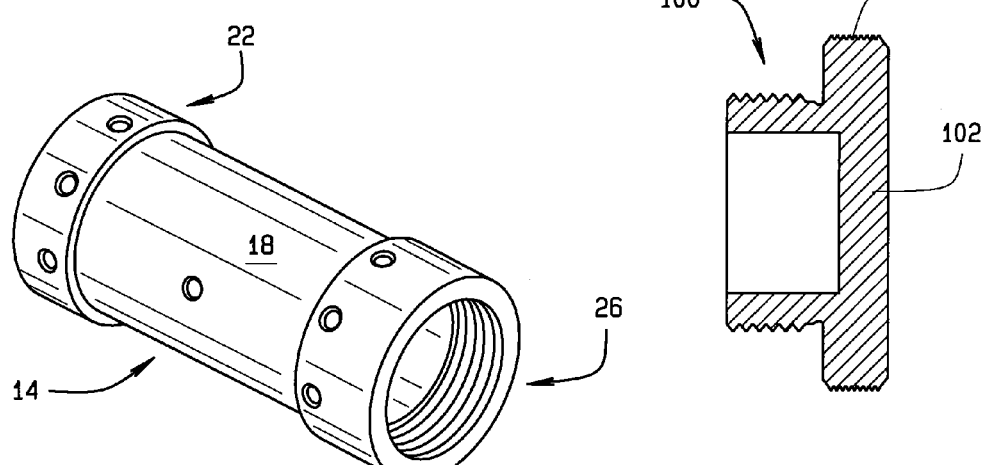
FIG. 8
FIG. 9
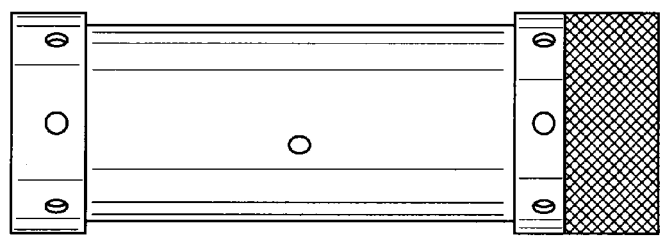
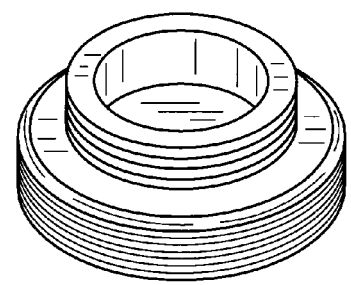
FIG. 10

SELF-CONTAINED NEEDLE INSERTION TRAINING SYSTEM

CROSS REFERENCE TO RELATED APPLICATIONS

This application claims the benefit of U.S. Provisional Application No. 61/147,372, entitled SELF-CONTAINED NEEDLE INSERTION TRAINING SYSTEM, filed on Jan. 26, 2009. The disclosure of the above application is incorporated herein by reference.

STATEMENT REGARDING FEDERALLY SPONSORED RESEARCH OR DEVELOPMENT

Not Applicable.

FIELD

The present teachings generally relate to medical needle insertion training, and more particularly to a novel self-contained catheter intravenous needle insertion training system.

BACKGROUND

The statements in this section merely provide background information related to the present disclosure and may not constitute prior art.

Learning the proper skill and precision for safely and effectively inserting a catheter needle, particularly intravenously or for decompression purposes, is a difficult and tedious process. Such training becomes more complex and complicated when the training must occur under field conditions, i.e., at locations other than established medical training facilities such as temporary and/or mobile military medical facilities or bases.

SUMMARY

The present disclosure, provides a self-contained catheter intravenous needle insertion training system. In various embodiments, the system includes a hollow body having at least one sidewall, a closed end, an opposing open end and an interior chamber. The system additionally includes a closure device structured and operable to mate with the open end to close the interior chamber and a simulated cardiovascular vein disposed along an outer surface of the at least one sidewall, wherein the interior chamber provides a storage space for medical devices to be used in association with the training system.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 1 is an isometric view of a self-contained catheter intravenous needle insertion training system, in accordance with various embodiments of the present disclosure.

FIG. 2 is a cross-sectional view of the self-contained catheter intravenous needle insertion training system shown in FIG. 1, along line 2-2, having a closure device separated from a body of the system, in accordance with various embodiments of the present disclosure.

FIG. 3 is an exploded view of the self-contained catheter intravenous needle insertion training system shown in FIG. 1, in accordance with various embodiments of the present disclosure.

FIG. 4 is an exploded view of the self-contained catheter intravenous needle insertion training system shown in FIG. 1 having a plurality of simulated cardiovascular veins, in accordance with various embodiments of the present disclosure.

FIG. 5 is an enlarged cross-sectional view of a portion of a simulated cardiovascular vein included in the self-contained catheter intravenous needle insertion training system shown in FIG. 1, in accordance with various embodiments of the present disclosure.

FIG. 6 is an enlarged cross-sectional view of a portion of a simulated cardiovascular vein included in the self-contained catheter intravenous needle insertion training system shown in FIG. 1, in accordance with other various embodiments of the present disclosure.

FIG. 7 is an enlarged cross-sectional view of a portion of a simulated cardiovascular vein included in the self-contained catheter intravenous needle insertion training system shown in FIG. 1, in accordance with still other various embodiments of the present disclosure.

FIG. 8 is an isometric view of an alternate unitized body for the self-contained catheter intravenous needle insertion training system, in accordance with various embodiments of the present disclosure.

FIG. 9 is a cross-sectional view of an alternate closure device for the self-contained catheter intravenous needle insertion training system, in accordance with various embodiments of the present disclosure.

FIG. 10 is a side view of the alternate unitized body of FIG. 8 and a perspective view the alternate closure device of FIG. 9, for the self-contained catheter intravenous needle insertion training system of the present invention in accordance with various embodiments of the present disclosure.

Figure 11:
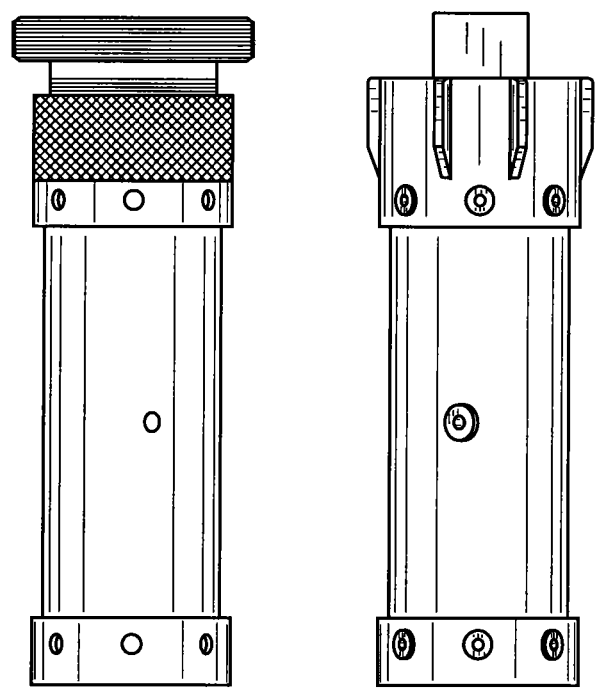

FIG. 11 is a side view of the alternate unitized body and alternate closure device of a self-contained catheter intravenous needle insertion training system of the present invention of FIG. 10 in accordance with various embodiments of the present disclosure, standing aside a body and closure device of the self-contained catheter intravenous needle insertion training system of FIGS. 1-7 in accordance with various embodiments of the present disclosure.

Figure 12:
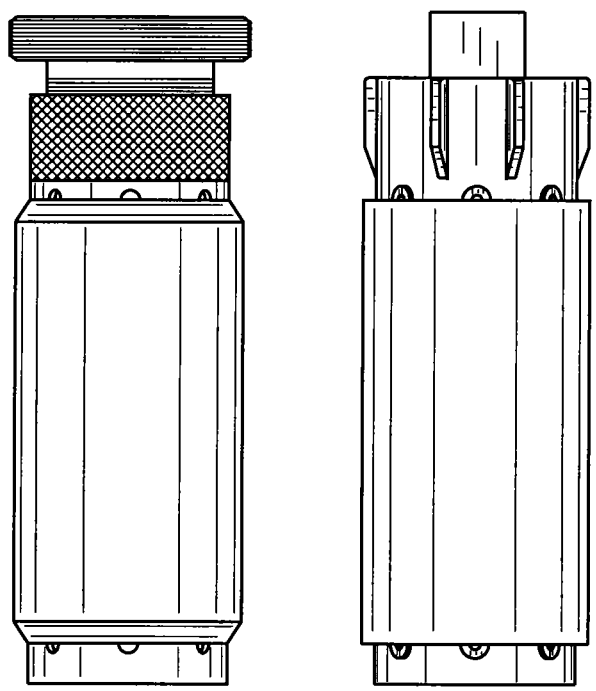

FIG. 12 is a side view of a self-contained catheter intravenous needle insertion training system of the present invention having the alternate unitized body of FIG. 8 in combination with the alternate closure device of FIG. 9 for the self-contained catheter intravenous needle insertion training system of the present invention in accordance with various embodiments of the present disclosure, standing aside the self-contained catheter intravenous needle insertion training system of FIGS. 1-7 in accordance with various embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements.

Referring to FIG. 1, the present disclosure provides a self-contained catheter intravenous needle insertion training system ("ITS") 10 that is structured and operable to provide an instrument or tool for users to practice various catheter intravenous needle insertion techniques.

Generally, the ITS 10 provides expedient and precise skills training for intravenous ("IV") and needle decompression education. The ITS 10 is structured and functional to be a total self-contained training device, whereby everything that is needed to conduct critical hands on lifesaving IV and needle decompression training is stored within the unit. It is envisioned that the ITS 10 can be used, for example, in the field by the U.S. military to instruct critical combat lifesaver skills to Soldiers and host nation forces, as well as providing an excellent training tool for the classroom setting.

Referring now to FIGS. 1, 2 and 3, in various embodiments, the ITS 10 includes a hollow tubular body 14 having at least one sidewall 18, a closed end 22, an opposing open end 26 and an interior chamber 30 formed by the wall(s) 18 and the closed end 22. Although the body 14 can include one or more sidewalls 18, for clarity and simplicity, the body will be described herein as including a single sidewall 18. That is, in various embodiments, the body can have a square, rectangular, triangular, etc., cross-section, such that the body 14 includes a plurality of sidewalls 18, or in various other embodiments, the body can have a circular, oval, elliptical, etc., cross-section, such that the body 14 includes a single circumferential sidewall 18. However, for simplicity and clarity, the sidewall(s) 18 will be referred to herein in the singular, e.g., sidewall 18.

The ITS 10 additionally includes a closure device 34 that is structured and operable to engage or mate with the open end 26 of the body 14 to close off the interior chamber 30 such that at least one medical device 38, to be used in association with the ITS 10, can be removably stored within the interior chamber 30. The at least one medical device 38 can be any device, mechanism, substance, applicator, accessory, component, tablet, capsule, caplet, etc. to be used in association with the ITS 10, e.g., a hypodermic syringe and associated needle assemblies, an intravenous catheter device and associated needle assemblies, decompression device and associated needle assemblies for evacuating air from a wound, alcohol or iodine swaps, scissors, a knife, tweezers, injectable medications, oral medications, a suture kit, etc.

In various implementations, the ITS 10 can include an annular collar 42 that is fixed to the body 14 at a first end to provide the open end 26 that is matable with the closure device 34. In other embodiments, the open end 26 can be configured to removably mate with the closure device 34 without an annular collar 42. Further, while the closure device 34 is depicted in FIGS. 1-4 as a threaded plug with a square protrusion that is used as a grip surface to effectuate the turning of the closure device 34 to open and close the ITS 10, the square protrusion can alternatively be configured in any number of readily understood configurations to provide a reasonable shape and surface to grip the closure device 34 for such opening and closing. For example, the closure device 34 can be configured as a cap having a knurled outer surface with no square protrusion, where the knurled outer surface provides a grip to enable the opening and closing of the ITS 10 with the closure device 34. (See FIGS. 9-12). Likewise, the closure device 34 may alternatively be configured, for example, as a threaded cap 100 having at its distal end an annular plate 102 that extends radially beyond the outer diameter of the body of the cap 100 to provide a knurled gripping surface 104 along the outer edge of the annular ring 102.

In further embodiments, the ITS 10 can include a cap 46 that is fixed to the body at a second end to provide the closed end 22. Alternatively, in various embodiments, the body 14 can be a single structure of unitary construction, e.g., a molded canister-like structure, having the closed and open ends 22 and 26 integrally formed with the sidewall 18. (See FIGS. 8-12).

The closure device 34 can be any device structured and operable to allow the open end 26 of the body 14 to be securely covered when it is desired to close off the interior chamber 30, and be removed from, or disengaged with, the open end 26 to allow access to the interior chamber 30. That is, the closure device 34 can be any device structured and operable to allow the ITS 10 to be opened and closed as desired to respectively allow or prevent access to the interior chamber 30. For example, in various embodiments, the closure device 34 can be a plug that is structured and operable to threadingly or frictionally engage the body 14 at or near the open end 26. Alternatively, in various embodiments, the closure device 34 can be a lid, door or any other structure, device or mechanism that is pivotally, rotatingly or hingedly connected to the body 14 at or near the open end 26 such that the structure, device or mechanism can be secured in a closed position, via any suitable latching device, and pivotally, rotatingly or hingedly moved to an open position upon release or uncoupling of the latching device.

Hence, the medical device(s) 38 can be placed in the interior chamber 18 and stored therein by placing the closure device 34 in a closed position, wherein the closure device 34 securely engages the body 14 at or near the open end 26. Subsequently, the medical device(s) 38 can be removed from the interior chamber 30 by placing the closure device 34 in an open position, wherein the closure device 34 is disengaged from the body open end 26, i.e., removed from or moved away from the body open end 26, thereby allowing access to the interior chamber 30.

With further reference to FIGS. 1, 2, and 3, the ITS 10 further includes one or more simulated cardiovascular veins 50 disposed along an outer surface of the body sidewall 18. As described further below, each simulated cardiovascular vein 50 is structured and operable to simulate a human cardiovascular vein such that a user of the ITS 10 can practice the proper technique of inserting a catheter intravenous needle into an actual human cardiovascular vein. Each simulated cardiovascular vein 50 is an elastomeric tube, or tubing, constructed of a suitable material, e.g., rubber or other elastic polymer or compound, sized and structured to simulate the feel, density, thickness and pliability of a human cardiovascular vein.

In various embodiments, each simulated cardiovascular vein 50 has opposing ends that are inserted through a respective pair of apertures 54 formed in the sidewall 18 near the closed and open ends 22 and 26 of the body. More particularly, the ends of the each simulated cardiovascular vein 50 extend through the respective apertures 54 into the interior chamber 30 where the ends are secured, via any suitable securing means, e.g., a clamp or knot, such that at least a portion of each simulated cardiovascular vein 50 between the respective ends is disposed along the outside of the outer surface of the body sidewall 18. Accordingly, the portion of each simulated cardiovascular vein 50 disposed along the outside of the outer surface of the body sidewall 18 is accessible by the user for use in practicing the proper technique of inserting a catheter intravenous needle into an actual human cardiovascular vein, as described further below.

In various embodiments, each simulated cardiovascular vein 50 has a length such that a supplementary portion of each vein 50 is disposed within the interior chamber 30 to provide additional simulated vein material for replacing the portion of each vein 50 disposed along the outside of the outer surface of the body sidewall 18. That is, as the portion of each vein 50 disposed along the outside of the outer surface of the body sidewall 18 deteriorates from use, the securing means of one end of the respective vein 50 can be released and the deteriorated portion can be pulled into the interior chamber 30 or alternatively removed and discarded. Simultaneously, the supplementary portion of the respective vein 50 can be pulled to the outside of the body 14 and disposed along the outer surface of the body sidewall 18, thereby replacing the deteriorated portion.

In various embodiments, the ITS 10 further includes a simulated flesh pad 58 disposed on the outer surface of the body sidewall 18 between the simulated cardiovascular vein (s) 50 and the sidewall 18. The simulated flesh pad 58 is structured and functional to simulate the density and pliability of human flesh adjacent, for example, the cardiovascular veins in a human forearm or hand. Additionally, in various embodiments, the ITS 10 includes a simulated skin jacket 62 disposed around the outer surface of the body sidewall 18 over the simulated cardiovascular vein(s) 50. The simulated skin jacket 62 is structured and functional to simulate the density and pliability of human skin adjacent the cardiovascular veins in a human forearm or hand.

Referring now to FIG. 4, in various embodiments, the ITS 10 further includes a needle decompression training orifice 66 extending through the sidewall 18. The needle decompression training orifice 66 is structured and functional to allow a user to practice inserting the needle of a decompression syringe into the chest of a patient to evacuate air from the patient's chest cavity, as described further below. In various implementations, a clavicle simulation pad 70 is positioned on the outer surface of the hollow body atop the needle depression training orifice 66. The clavicle simulation pad 70 is structured to simulate the feel, density, thickness and pliability of human clavicle tissue.

Furthermore, in various embodiments, the ITS 10 includes a plurality of the simulated cardiovascular veins 50 and the needle decompression training orifice 66 is formed within the sidewall 18 between a pair of adjacent simulated cardiovascular veins 50, such that the adjacent simulated cardiovascular veins 50 simulate the ribs of a human torso skeletal structure. For example, in various implementations, the adjacent simulated cardiovascular veins 50 can simulate the second and third ribs of a human torso skeletal structure. Still further, in various embodiments, the ITS 10 can include an inflatable air sack 74 structured and operable to be inflated and placed into the interior storage chamber 30 adjacent the needle decompression training orifice 66. Therefore, if a user properly inserts the needle of a decompression syringe into the needle decompression training orifice 66, simulating proper insertion of the needle into the chest cavity of a patient, the air sack 74 will be pierced and the air can be evacuated via the decompression syringe, as described in detail below.

Referring now to FIG. 5, in various embodiments, one or more of the simulated cardiovascular veins 50 houses a gas, such as air, to simulate dry intravenous needle insertion. For example, in various embodiments, each simulated cardiovascular vein 50 includes a center bore 78 that extends along the entire length of the respective vein 50. In various implementations, the center bore 78 of one or more simulated cardiovascular veins 50 can be filed with a gas, such as air, for simulated dry intravenous needle insertion.

Conversely, in other various embodiments, one or more of the simulated cardiovascular veins 50 houses a liquid to simulate wet intravenous needle insertion. For example, in various implementations, the center bore 78 of one or more simulated cardiovascular veins 50 can be filled with a liquid, such as colored saline solution, for simulated wet intravenous needle insertion. Therefore, if a user properly inserts a needle into the vein 50, the user can draw, or extract, some or all of the liquid from the center bore 78. Further, in yet other various embodiments, the liquid may be held under pressure within vein 50 to provide more realistic simulation of human veins and arteries.

Referring now to FIG. 6, in various other embodiments, the center bore 78 of one or more simulated cardiovascular veins 50 can include a single fluid reservoir 82 that is filled with a liquid, such as colored saline solution, to simulate wet intravenous needle insertion. Therefore, if a user properly inserts a needle into the single fluid reservoir 82 of the vein 50, the user can draw, or extract, some or all of the liquid from the single fluid reservoir 82. In other various embodiments, the liquid may be held under pressure within the single fluid reservoir 82 to provide more realistic simulation of human veins and arteries.

Referring now to FIG. 7, in yet other embodiments, the center bore 78 of one or more simulated cardiovascular veins 50 can include a plurality of reservoirs 86 wherein at least one of the reservoirs 86 is filled with a fluid, such as colored saline solution, to simulate wet intravenous needle insertion. Therefore, if a user properly inserts a needle into one of the reservoirs 86 filled with fluid, the user can draw, or extract, some or all of the fluid from the fluid respective reservoir. Such embodiments allow the user to perform multiple simulated wet intravenous needle insertions into a single respective simulated cardiovascular vein 50 by utilizing each of the reservoirs 86 filled with fluid. Accordingly, to increase the number of simulated wet intravenous needle insertions that can be performed using each simulated cardiovascular vein 50, the number of reservoirs 86 within each respective vein 50 can be increased and/or the number of reservoirs 86 filled with fluid can be increased. For example, two or more adjacent reservoirs 86, or all of the reservoirs 86 can be filled with fluid. In other various embodiments, the fluid may be held under pressure within one or more of the reservoirs 86 to provide more realistic simulation of human veins and arteries.

Referring now to FIGS. 1, 2, 3 and 4, in various embodiments, the ITS 10, e.g., the body 14, can be sized to approximate the average size of a human forearm or wrist such that the ITS 10 can be securely held and stabilized with one hand of the user, leaving the user's other hand free to practice needle insertion techniques, as described below.

Operation and use of the ITS 10 will now be described. As described above, the ITS 10 can be utilized to simulate dry intravenous needle insertion. For example, in various embodiments, one or more of the simulated cardiovascular veins 50 of the ITS 10 can be utilized to practice inserting an IV needle and advancing an associated catheter into the vein 50. To perform such a dry intravenous needle insertion training procedure utilizing the ITS 10, the user places the closure device 34 in the open position and removes the desired medical device 38, e.g., an 18 gauge catheter needle, saline lock and custom IV line, from the interior chamber 30. The user may then replace the closure device 34 in the annular ring 42 to close the SCNHITS 10. Next, the user positions the ITS 10, for example, in one of the user's hands. Alternatively, the user may position the SCNHITS 10, for example, on a table top or in his/her lap with one hand supporting the device. The user will then complete a pre-execution check of the IV supplies, e.g., the 18 gauge catheter needle, saline lock and custom IV line, to ensure good serviceability, and place them within reach. Subsequently, using proper technique, the user holds the needle between his/her index finger and thumb and removes a safety cap from the needle. With the opposite hand, using his/her thumb and index finger, the user forms the letter "C" and positions his/her index finger over the selected simulated cardiovascular vein 50 and above the injection site, (this will keep the vein 50 from rolling and act as a pressure point to slow blood loss from an actual needle insertion, once the needle is removed). Subsequently, the user positions his/her thumb below the injection site and applies a small amount of downward tension pulling the simulated skin jacket 62 taunt. The thumb may also be used as a support for the needle to ensure a 45° angle.

Next, the user positions the needle at approximately a 45° angle with the bevel edge of the needle facing upward and slowly inserts the needle into the vein 50. Due to the construction of the simulated cardiovascular veins 50, the user will feel a small amount of resistance as the needle advances through the simulated skin 62 and the wall of the vein 50. Once the needle is properly inserted, the user repositions his/her thumb to allow the needle to drop down to above the skin level. Next, the user slowly advances the needle approximately another ¼ of an inch into the vein 50. Without moving the needle, the user slowly advances the catheter into the simulated vein 50. Next, while continuing to apply pressure with his/her index finger above the injection site, the user removes the needle, leaving the catheter in place.

As also described above, the ITS 10 can be utilized to simulate wet intravenous needle insertion. For example, in various embodiments, one or more of the simulated cardiovascular veins 50 of the ITS 10 can be filled with a liquid, as described above, and be utilized to practice inserting an IV needle and obtaining an actual "flash" of blood in the needle chamber. Similar to the dry intravenous needle insertion training procedure described above, to perform such a wet intravenous needle insertion training procedure utilizing the ITS 10, the user places the closure device 34 in the open position and removes the desired medical device 38, e.g., a syringe and associated needle assembly, from the interior chamber 30. The user may then replace the closure device 34 in the annular ring 42 to close the SCNHITS 10. Next, the user positions the ITS 10, for example, in one of the user's hands. Alternatively, the user may position the SCNHITS 10, for example, on a table top or in his/her lap with one hand supporting the device. The user will then complete a pre-execution check of the IV supplies, e.g., the syringe and associated needle assembly, to ensure good serviceability, and place them within reach. Subsequently, using proper technique, the user holds the needle between his/her index finger and thumb and removes a safety cap from the needle. With the opposite hand, using his/her thumb and index finger, the user forms the letter "C" and positions his/her index finger over the selected simulated cardiovascular vein 50 and above the injection site, (this will keep the vein 50 from rolling and act as a pressure point to slow blood loss from an actual needle insertion, once the needle is removed). Subsequently, the user positions his/her thumb below the injection site and applies a small amount of downward tension pulling the simulated skin jacket 62 taunt. The thumb may also be used as a support for the needle to ensure a 45° angle.

Next, the user positions the needle at approximately a 45° angle with the bevel edge of the needle facing upward and slowly inserts the needle into the vein 50. Due to the construction of the simulated cardiovascular veins 50, the user will feel a small amount of resistance as the needle advances through the simulated skin 62 and the wall of the vein 50. Once the needle is properly inserted, the user repositions his/her thumb to allow the needle to drop down to above the skin level. Next, the user slowly advances the needle approximately another ¼ of an inch into the vein 50. If the needle is properly inserted into the liquid filled vein 50 (or, in other embodiments, the single liquid filled reservoir 82 or one of the plurality of liquid filled reservoirs 86), the user will see a "flash" of liquid in the chamber of the syringe, simulating a "flash" of blood into the syringe chamber during an actual wet intravenous needle insertion. Once the syringe is filled with liquid, i.e., simulated blood, the user again applies pressure with his/her index finger above the injection site, and removes the needle.

As further described above, the ITS 10 can be utilized to perform needle decompression training. To perform such needle decompression training, the user places the closure device 34 in the open position and removes the desired medical device 38, e.g., a decompression syringe and a 14 gauge catheter needle, from the interior chamber 30, as described above. In various implementations, the user can next inflate the air sack 74 and insert the air sack 74 into the interior chamber 30 beneath the needle depression training orifice 66. The user may then replace the closure device 34 in the annular ring 42 to close the SCNHITS 10. Next, the user completes all pre-execution checks of equipment and positions the ITS 10, for example, in one of the user's hands. Alternatively, the user may position the SCNHITS 10, for example, on a table top or in his/her lap with one hand supporting the device. The user then identifies the proper insertion site between the two adjacent cardiovascular simulated veins 50, to simulate locating the middle of a human clavicle between the second and third ribs. Subsequently, the user removes the safety cap from the 14 gauge needle and holds the needle at approximately a 90° angle to the injection site, i.e., above the needle depression training orifice 66. Then, applying firm, but gentle, pressure the user advances the needle through the simulated skin jacket 62 and flesh pad 58. The user continues to advance the needle until the catheter hub is against the simulated skin jacket 62. Then, while holding the catheter needle in place, the user removes the needle, secures the catheter hub in place with tape and attaches a small flutter valve to the hub. Decompression can then be verified by checking the air sack 74 to determine whether the air from within the air sack 74 has been evacuated.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A self-contained medical needle insertion training system comprising:
   a. a body sized and configured to be held in one hand by a user, the body having at least one sidewall with an outer surface and an inner surface, a chamber within the body defined at least in part by the inner surface of the sidewall, and an opening to the chamber defined in the sidewall;
   b. a closure removably receivable by the body to close the opening in the chamber; and
   c. a first removable simulated cardiovascular blood vessel disposed along the outer surface of the sidewall;
   wherein the chamber is configured to removably store one or more medical syringes within the chamber when closed by the closure.

2. The system of claim 1, wherein the chamber is configured to removably store at least a portion of the simulated cardiovascular blood vessel within the chamber.

3. The system of claim 2, wherein the sidewall defines a hole in the chamber, the hole sized and configured to allow the longitudinal extraction of at least a portion of the simulated cardiovascular blood vessel through the hole from within the chamber, while maintaining the storage of the remainder of the blood vessel within the chamber.

4. The system of claim 1, wherein the simulated cardiovascular blood vessel houses a gas for dry intravenous needle insertion training.

5. The system of claim 1, wherein the simulated cardiovascular blood vessel houses a liquid for wet intravenous needle insertion training.

6. The system of claim 1, wherein the simulated cardiovascular blood vessel comprises a plurality of reservoirs defined within the blood vessel, wherein at least one of said reservoirs contains a liquid.

7. The system of claim 1, wherein the opening and the closure are configured to form a watertight seal there between when engaged with one another.

8. The system of claim 1, further comprising a simulated flesh pad disposed on the outer surface of the body between the simulated cardiovascular blood vessel and the sidewall.

9. The system of claim 1, further comprising a covering of simulated skin, the covering disposed at least in part over a portion of the simulated cardiovascular blood vessel.

10. The system of claim 9, wherein the outer surface of the sidewall comprises a circumference and the covering comprises a wrap adapted to be removably disposed in a snug manner over at least a portion of the blood vessel and about the circumference of the outer surface.

11. The system of claim 1, further comprising an orifice extending through the sidewall into the chamber, the orifice sized and configured to receive a medical decompression needle there through.

12. The system of claim 11, further comprising a bladder disposed within the chamber adjacent the orifice such that a user may insert a medical decompression needle through the orifice and puncture the bladder within the chamber.

13. The system of claim 11, further comprising a clavicle simulation pad disposed on the outer surface of the sidewall at least in part atop the orifice.

14. The system of claim 12, wherein the bladder is inflatable.

15. The system of claim 1, wherein the simulated cardiovascular blood vessel comprises a first end and a second end and the sidewall defines a first hole in the chamber, the first hole sized and configured to allow the longitudinal extraction of the first end of the simulated cardiovascular blood vessel through the hole from within the chamber, the system further comprising a retainer adapted to releasably secure the second end of the simulated cardiovascular blood vessel inside the chamber.

16. The system of claim 15, wherein the sidewall defines a second hole in the chamber, the first and second holes sized and configured to allow the longitudinal extraction of the simulated cardiovascular blood vessel through each, the system further comprising a clamping device adapted to releasably secure both ends of the simulated cardiovascular blood vessel inside the chamber.

17. The system of claim 1, wherein the simulated cardiovascular blood vessel comprises a first portion and a second portion and the sidewall defines a first hole in the chamber, the first hole sized and configured to allow the longitudinal extraction of the first portion of the simulated cardiovascular blood vessel through the hole from within the chamber, the system further comprising a clamping device adapted to releasably secure the second portion of the simulated cardiovascular blood vessel inside the chamber.

18. The system of claim 17, wherein the simulated cardiovascular blood vessel further comprises a third portion between the first and second portions and the sidewall defines a second hole in the chamber, the first and second holes oriented longitudinally along the outer surface of the body, the first and second holes sized and configured to allow the longitudinal extraction of the simulated cardiovascular blood vessel through each, the system further comprising one or more retainers adapted to releasably secure the first and third portions of the simulated cardiovascular blood vessel inside the chamber when the third portion is positioned along the outer surface of the body.

19. The system of claim 1, further comprising a second removable simulated cardiovascular blood vessel disposed along the outer surface of the sidewall, the first simulated cardiovascular blood vessel housing a gas for dry intravenous needle insertion training, the second simulated cardiovascular blood vessel housing a liquid for wet intravenous needle insertion training.

20. The system of claim 1, wherein the body comprises a tube.

21. The system of claim 20, wherein the tube is cylindrical.

22. A self-contained medical needle insertion training system comprising:
  a. a body sized and configured to be held in one hand by a user, the body having at least one sidewall with an outer surface and an inner surface, a chamber within the body defined at least in part by the inner surface of the sidewall, an opening to the chamber defined in the sidewall, and a hole to the chamber defined in the sidewall;
  b. a closure removably receivable by the body to close the opening in the chamber; and
  c. a removable simulated cardiovascular blood vessel disposed along the outer surface of the sidewall;
  wherein the chamber is sized and adapted to removably store at least a portion of the simulated cardiovascular blood vessel within the chamber when closed by the closure, and the hole is sized and configured to allow the longitudinal extraction of at least a portion of the simulated cardiovascular blood vessel through the hole from within the chamber, while maintaining the storage of the remainder of the blood vessel within the chamber.

23. The system of claim 22, wherein the chamber is sized and configured to removably store one or more medical syringes within the chamber when closed by the closure.

24. The system of claim 22, further comprising an orifice extending through the sidewall into the chamber, the orifice sized and configured to receive a medical decompression needle there through.

25. The system of claim 24, further comprising a bladder disposed within the chamber adjacent the orifice such that a user may insert a medical decompression needle through the orifice and puncture the bladder within the chamber.

26. The system of claim 22, wherein the body comprises a tube.

27. The system of claim 26, wherein the tube is cylindrical.

* * * * *